Dec. 13, 1949     C. H. GAY     2,490,795
BANDING APPARATUS
Original Filed May 17, 1941     5 Sheets-Sheet 1
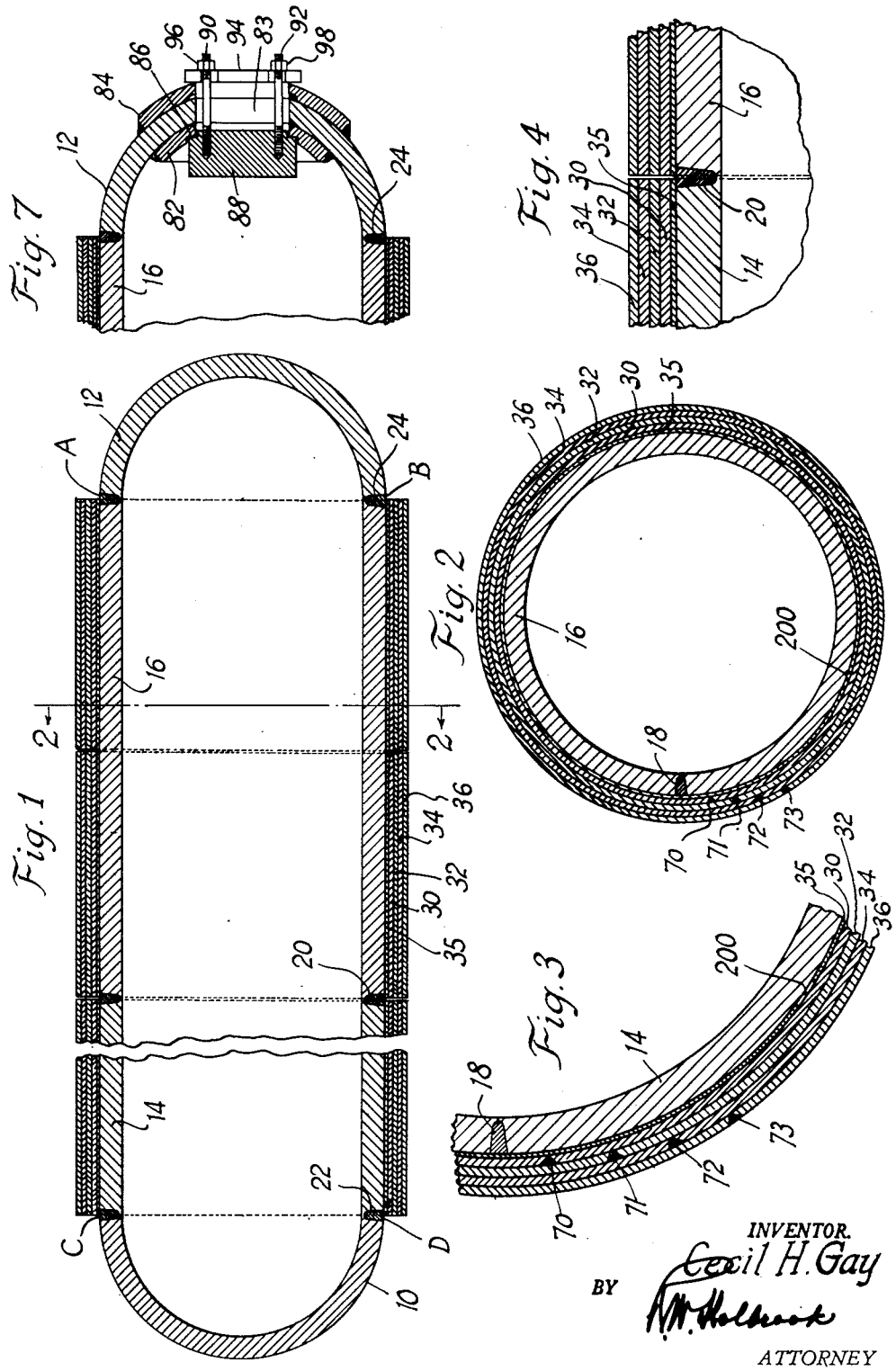
INVENTOR.
Cecil H. Gay
BY
ATTORNEY Dec. 13, 1949  C. H. GAY  2,490,795
BANDING APPARATUS
Original Filed May 17, 1941  5 Sheets-Sheet 2
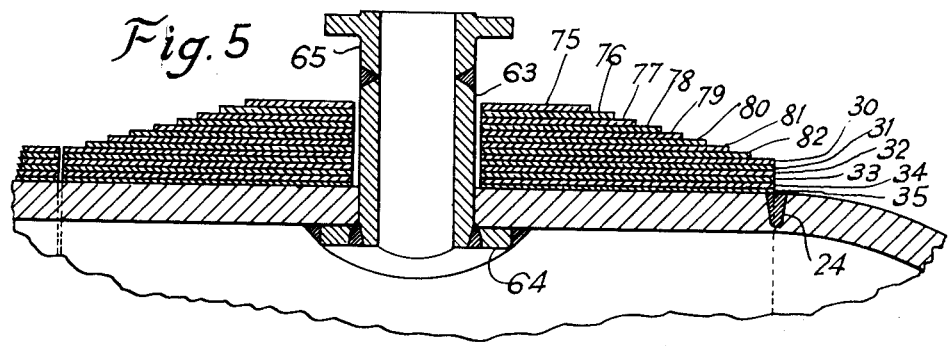
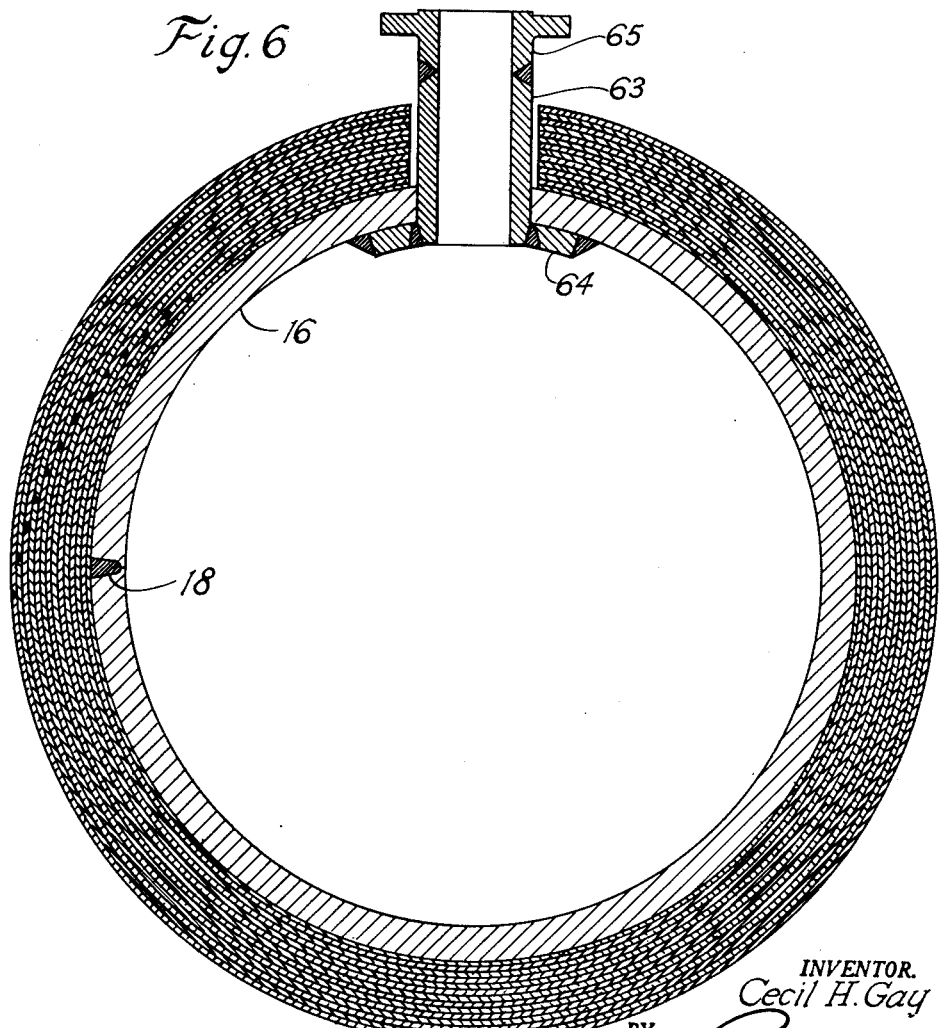
INVENTOR.
Cecil H. Gay
BY
[signature]
ATTORNEY Dec. 13, 1949           C. H. GAY           2,490,795

BANDING APPARATUS

Original Filed May 17, 1941           5 Sheets-Sheet 3

INVENTOR
Cecil H. Gay
BY
R. W. Holbrook
ATTORNEY

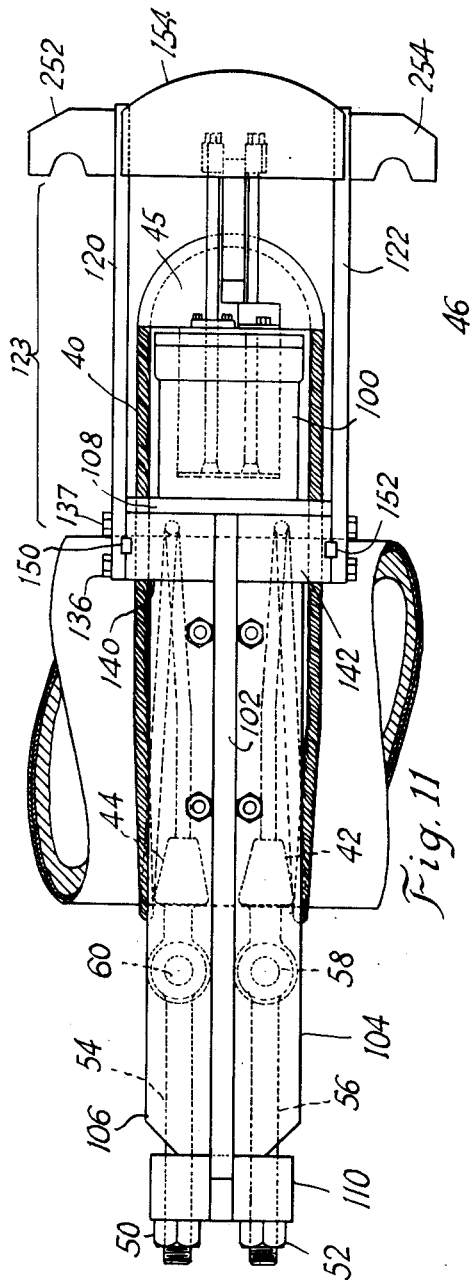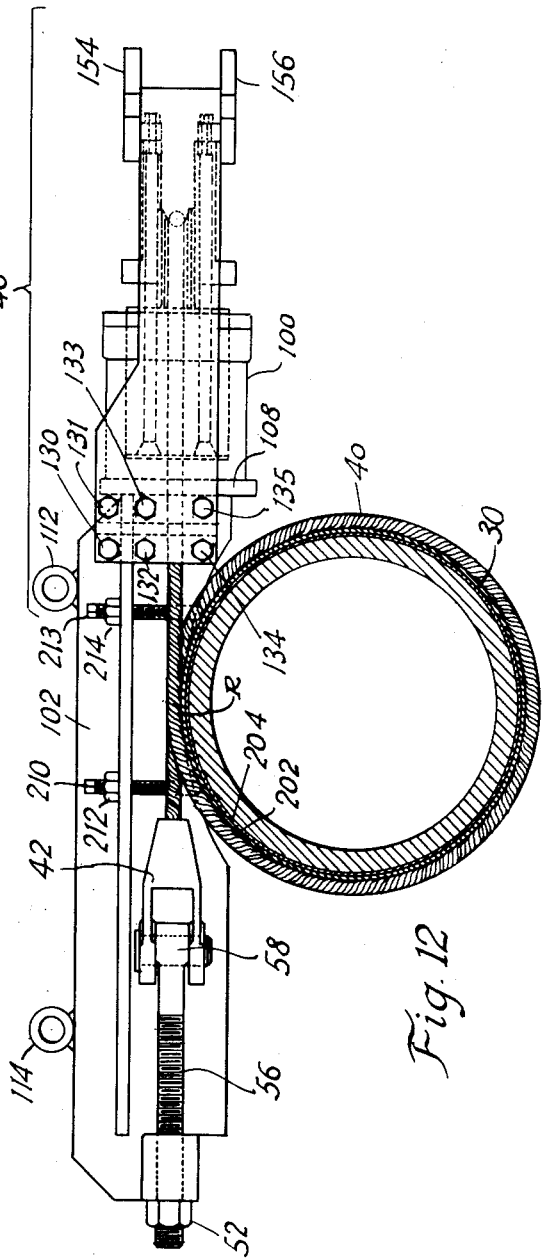

Dec. 13, 1949 C. H. GAY 2,490,795
BANDING APPARATUS
Original Filed May 17, 1941 5 Sheets-Sheet 5
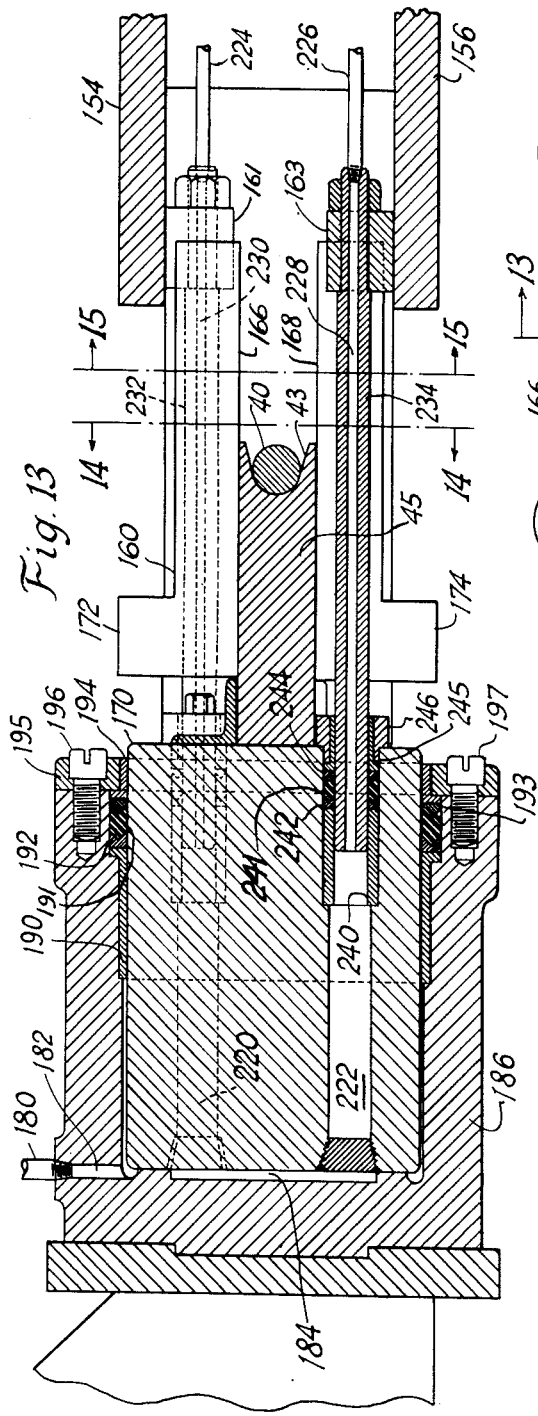
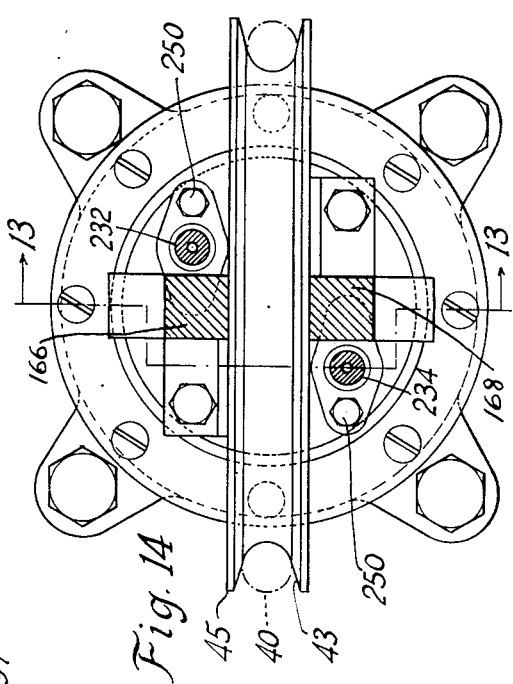
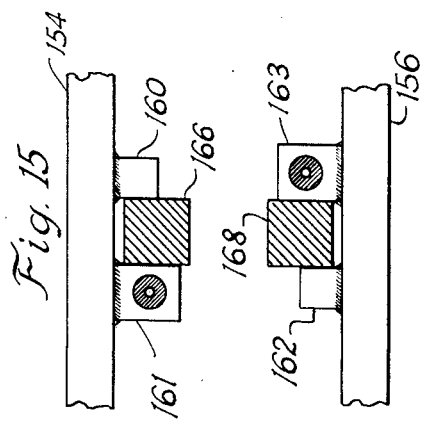
INVENTOR.
Cecil H. Gay
BY
ATTORNEY Patented Dec. 13, 1949

2,490,795

UNITED STATES PATENT OFFICE 2,490,795

BANDING APPARATUS

Cecil H. Gay, Akron, Ohio, assignor to The Babcock & Wilcox Company, Newark, N. J., a corporation of New Jersey Original application May 17, 1941, Serial No. 393,876. Divided and this application April 8, 1944, Serial No. 530,178

2 Claims. (Cl. 113—102)

My invention relates to apparatus for fabricating banded pressure vessels.

The invention is particularly concerned with an apparatus for fabricating pressure vessels which are adapted for advantageous use in industries involving operations at high fluid pressures. The walls of pressure vessels for withstanding such pressures must be of such great thickness that many difficulties have been encountered in their fabrication. For example, it has been proposed to forge such pressure vessels from a single ingot, but this process has been found to involve almost prohibitive expense. One reason for this is that the forging process involves numerous heatings and reheatings of the metal in order to maintain it at forging temperature throughout the manufacturing operations. The pertinent pressure vessel eliminates such operations.

The invention presents an apparatus for manufacturing a composite pressure vessel construction the inner part of which includes a welded shell of uniform plate thickness with hemispherical heads of the same plate thickness at their positions of attachment to the cylindrical shell, the plate thickness of the shell being determined by the thickness of the plate in the heads. The shell is fabricated by forming plate sections to shell diameter and then welding them into annular shell sections. The latter are united by girth welds at their meeting edges and the hemispherical heads are then welded thereto. The welds are X-rayed and if any defects are found the defective welds are removed and replaced. The construction is then stress relieved. For pressure vessels thus fabricated such standards as those of the A. S. M. E. Code for unfired pressure vessels limit the permissible value of the design stress on the welds to not more than 90% of that allowable for the plate metal of the components of the vessel joined by the welds.

The remainder of the pertinent pressure vessel consists of successively applied and substantially concentric bands of sheet metal each individually clamped circumferentially of the shell and secured by a longitudinal seam weld formed between its ends while the band is held in clamped position. These bands are applied throughout the length of the shell, and a plurality of them are directly superimposed and arranged to form separated sections of superimposed bands along the length of the shell. This results in a multiple layer construction without girth welds between the bands of successive sections.

Such standards as the A. S. M. E. Code for pressure vessels permit the design of pressure vessel welds, when not X-rayed and annealed, with unit design stresses in the metal of the weld, limited to 80% of the metal of the adjacent sheet or plate. As the stresses in the metal of the wall of a vessel subjected to internal pressure are greatest at the internal wall and decrease progressively to the outer layers or laminae, it will be evident that outer layers are subject to much lower unit stresses, and by the selection of the thickness of the inner welded, X-rayed and heat treated cylinder with respect to the thickness of the added bands, it is possible according to the present invention to attain a maximum unit stress in the bands which is 80% of the permissible unit stress for the metal used in the body portion of the weld.

The resulting pressure vessel is one of which the average stress throughout the wall thickness of its cylindrical section is approximately the same as that required for a single wall thickness vessel, welded, stress relieved, and X-rayed, although more than 50% of the wall thickness requires no stress relieving or X-raying. Furthermore, the total wall thickness of the cylindrical section of the illustrative pressure vessel is no greater than that required for a unitary plate welded construction which has been totally stress relieved and X-rayed.

Other objects of the invention will appear in the following description which refers to the accompanying drawings.

In the drawings:

Fig. 1 is a longitudinal vertical section of the illustrative pressure vessel;

Fig. 2 is a transverse vertical section on the line 2—2 of Fig. 1;

Fig. 3 is a detail view showing the offset arrangement of the longitudinal welds in successive laminae of the outer part of the wall of the cylindrical section of the illustrative pressure vessel;

Fig. 4 is a detail view showing a section of a girth weld in the inner shell construction and indicating the lack of similar welds between the bands of successive sections of the outer shell;

Fig. 5 is a partial vertical section (longitudinally of the pressure vessel) showing the modification of the construction of a section of the illustrative pressure vessel associated with a side nozzle welded to the inner shell and extending through additional bands;

Fig. 6 is a vertical section on a plane transversely of the pressure vessel and passing through the center of the nozzle shown in Fig. 5;

Fig. 7 is a partial longitudinal section showing a pressure vessel with a modified head construction;

Fig. 11 is a plan of apparatus for clamping the bands upon the inner shell prior to the welding of the opposite ends of the bands together;

Fig. 12 is an elevation of the apparatus shown in Fig. 11, showing the pressure vessel in transverse vertical section;

Figure 8:
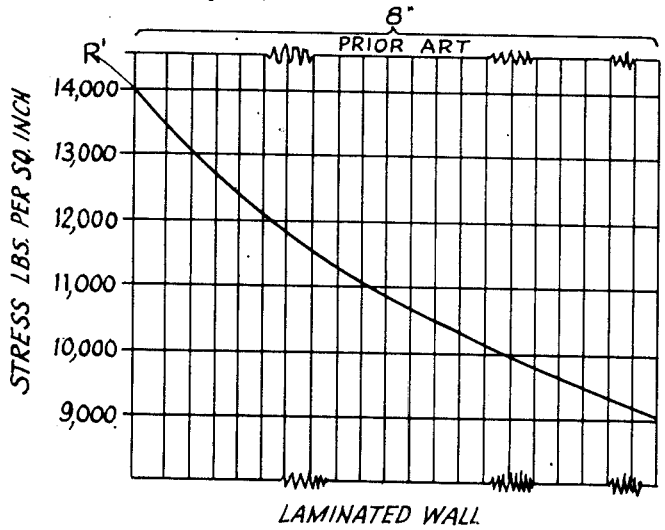
Fig. 8 is a diagrammatic view indicating a stress curve through the wall of a prior art laminated pressure vessel wall.

Fig. 13 is a sectional view of the hydraulic jack for the band applying device; and Figs. 14 and 15 are sections on the lines 14—14 and 15—15, respectively, of Fig. 13.

Referring to Fig. 1 of the drawings, the thickness of the inner shell is determined by the minimum thickness of the metal required for the hemispherical heads 10 and 12, these heads involving the most effective use of metal for a given working pressure.

As shown, the inner shell consists of a plurality of annular sections 14 and 16 made up of single plate sections formed to the diameter of the shell. For pressure vessels of large diameters each of these sections may involve a plurality of segments, but in the illustrative construction each section involves a single plate bent to circular form with its opposing ends united by a single longitudinal weld 18.

After the annular sections of the inner shell are fabricated, they are fixed in alignment and then united by a girth weld 20 to form the inner cylindrical shell. Thereafter the forged hemispherical heads 10 and 12 are similarly united with the inner shell by the circumferential welds 22 and 24.

All of the welds uniting the parts of the inner shell are then completely X-rayed as a check upon the quality of the welds. If defects are found the defective weld metal is removed and replaced. In this connection the present invention involves important advantages due to the fact that it permits the employment of metal plates much thinner than those which are required when the entire vessel is of a single plate construction. In the first place, the quality of the thinner plates is apt to be much more uniform and otherwise superior to that of plates of greater thickness. In the second place, the X-rays of the welds, because of their relative thinness can be of high quality. In single plate constructions for very high pressures, the thick plates are joined by welds of such depth that the maximum effective range of the X-ray equipment is approached, if not exceeded. Thirdly, the cost of making X-rays of the thicker welds is considerably more than that for the smaller welds, the time of making each X-ray varying directly with the square of the depth (or thickness) of the weld.

After it is determined that all of the welds of the inner shell are of the desired high quality, the shell is placed in a furnace and stress relieved. The shell is then allowed to cool before application thereto of the components of the outer shell.

As shown in the drawings, the outer shell consists of four series of bands 30, 32, 34, and 36. They are preferably thin plate sections which are separately formed around the inner shell and tightly clamped thereon by the apparatus illustrated in Figs. 11–15. This apparatus includes a looped cable 40, the ends of which are anchored in clevises 42 and 44 while the middle part of the loop is seated within the groove 43 of the yoke or sheave 45 at the forward end of a base or frame 46. This frame is preferably of a heavy steel construction in order to successfully withstand the reactions of the mechanism carried thereby. That part of the frame extending from the hydraulic jacks 100 to the left in Figs. 11 and 12 includes a body plate 102, the side web plates 104 and 106, the end plate 108, and the rear block 110, all of which are preferably welded together in the relationships indicated.

At the top of the body plate 102 are eye rings 112 and 114 preferably welded to the body plate at the positions indicated. These rings are for the purpose of handling the entire band tightening mechanism and for moving it from one position to another along the drum upon which it is to be applied, and from one position to another in the shop. The eye ring 112 is preferably located at the balancing point of the mechanism.

The clevis eye bolts 54 and 56 extend through openings in the rear block 110 and are disposed on opposite sides of the body plate 102. They are held in their operative positions, and may be adjusted by the screw-threaded elements 50 and 52, threaded upon the end of the eye bolts and abutting against the rear surface of the heavy block 110.

That part of the band tightener already described may be referred to as a backup strut, and at its forward end a heavy steel end plate 108 is maintained in a vertical position by welds which unite it with the forward end of the body plate 102 and the web plates 104 and 106.

That part of the band tightener frame at the right in Figs. 11 and 12 may be termed a bridge piece 123. It includes longitudinal side plates 120 and 122, rigidly bolted by the elements 130—137 to the blocks 140 and 142, and similar elements rigidly welded to the end plate 108 and the body plate 102 of the backup strut. In order that the bridge piece may be readily and accurately placed in the correct position relative to the backup strut, assembly keys 150 and 152 are driven into openings each of which is partly formed by a channel in one of the side plates while its remainder is formed by one of the channels in the blocks 140 and 142, or other associated elements of the backup strut construction.

At the forward or right hand end (Figs. 11 and 12) of the bridge piece, there are upper and lower cross plates 154 and 156 preferably welded to the forward ends of the side plates 120 and 122. As indicated in Figs. 13 and 15 of the drawings, these cross plates carry fixed guide blocks 160—163. The guide blocks 160 and 161 are welded to the under side of the cross plate 154 and are spaced so that the guide member 166 may slide in the space between them. A similar relationship exists between the lower guide member 168 and the guide blocks 162 and 163 which are secured to the upper side of the lower cross plate 156.

The parallel guide members 166 and 168 are rigidly secured to the yoke or sheave 45 in the positions illustrated in Figs. 13–15 of the drawings and this yoke is rigidly secured to the forward end of the piston 170 of the hydraulic jack. The guide members 166 and 168 are preferably of heavy steel construction and are welded to the yoke 45 on its upper and lower surfaces, respectively. The guide member 168 has an upper projection 172 at its rearward end, and a similarly arranged downward projection 174 of the guide member 168 co-operates with the projection 172 and the cross plates 154 and 156 to limit the forward movement of the yoke 45 and the piston 170 when the apparatus is being used to tighten a band upon the inner shell.

With the ends of the cable anchored within the clevises 42 and 44 and the intermediate portion of the cable wrapped around a band as indicated in Fig. 12 of the drawings, the band is tightened upon the inner shell by the flow of pressure fluid through the tube 180 and the duct 182 which communicates with the space 184 rearwardly of the piston 170 and within the hydraulic cylinder 186. Very high hydraulic pressures are involved in this operation, and leakage of the pressure fluid is prevented by the gland elements 190—197 secured at the forward or right hand of the cylinder 186, as indicated in Fig. 13.

A backing-up strip or band 35 (Fig. 12) is interposed relative to the band 30 and the shell 16. It is not welded to the shell 16, and its opposite ends may be spaced from each other as indicated at 200 in Fig. 12. An important point with reference to the use of this backing-up strip is that its ends are remote from the position 202 at which the ends of the first band 30 terminate.

Before the pressure of the band tightener is applied (with the elements in relative positions somewhat similar to those indicated in Fig. 12 of the drawings), the end 204 of the band 30 is positioned below the band tightener apparatus at such a distance that tack welding of the ends of the band 30 between the two parts of the band tightening cable, will be facilitated.

After the end 204 of the band 30 is positioned as shown, the band tightener is lowered upon the band and adjusted to its desired position by two sets of screw-threaded elements 210—214, there being a set on each of the side plates 104 and 106.

As fluid enters the space 184 to force the piston 170 forwardly and tighten the cable, there is co-ordination of the cable stretching and the band bending action to eliminate bends or folds in the band when it has received its final tightening upon the inner shell. The weight of the tightener has an anchoring effect on the band at the position R (Fig. 12) and the stretch of the cable is cumulative from that position clockwise around the inner shell.

After the final tightening, tack welds are formed between the adjacent ends of the band 30 (at 202), the backing-up band 35 preventing the development of local stresses in the metal of the inner shell 16 by this welding.

After the tack welds between the ends of the band 30 are made, a valve in an outlet tube communicating with the space 184 is opened. Thereupon, the cable 40 is loosened upon the drum and the piston 170 is pushed back to the position in which it is shown in Fig. 13 by the admission of fluid to the push back cylinders 220 and 222 formed by bores within the piston 170. This fluid passes to the cylinders 220 and 222 through the tubes 224 and 226 which are in communication with bores 228 and 230 formed in the rods 232 and 234. These rods are secured at their forward ends within openings in the guide blocks 161 and 163 in the manner indicated in Fig. 13, and their opposite ends are fitted within gland elements 240—246 disposed between the rods and the metal of the piston 170 and secured in these positions by the cap screws 250 which are screw threaded into the piston.

The handling of the band tightening mechanism is also facilitated by the hook plates 252 and 254 (see Fig. 11) which are welded to the side plates 120—122 in the positions shown.

Successive bands such as the bands 31—33 and 75—82, Fig. 5, are secured in position in the manner above indicated, complete welds being formed between the adjacent ends of each tightened band immediately after the removal of the band tightener therefrom.

When the bands are considerably wider than the distance between the adjacent shell encircling loops of the band tightener cable, the first band tightening and welding operations take place along the longitudinal center of a band and the successive band tightening and welding operations take place first at one side of the zone of the first band tightening, and then at the other side.

Preferably, the longitudinal welds 18 of the inner shell and the successive welds 70—73 of the laminae of the outer shell are spaced circumferentially of the shell as indicated in Fig. 3 of the drawings. There are no circumferential welds at the junctions of the outer shell sections, as indicated in Fig. 4.

At one end of the pressure vessel, the ends of the outer shell laminae adjacent the head 12 preferably terminate at a plane including the line A—B which is a diameter of the hemispherical head 12. A similar relationship of elements applies at the other end of the pressure vessel, the line C—D (in the plane in which the adjacent ends of the adjacent laminae terminate) being a diameter of the hemisperical end 10 within a plane at which the adjacent bands terminate. With this construction, and with the effective number of bands applied adjacent the heads, all material of the pressure vessel is subject to the same unit stress, and no bending stress exists at the junctures of the heads and the cylindrical section of the shell.

Comparing the illustrative construction with a pressure vessel which is entirely constructed of such thin laminations as 32, 34, and 36 of the present construction, and if it is assumed that the recognized construction code specifies a wall thickness of 8" for the wholly laminated vessel, then, for the same inside diameter, and same pressure, the illustrative pressure vessel requires a wall thickness of only 6.4314 inches to maintain all stresses within code limitations. Such a comparison will be indicated from an inspection of Figs. 8 and 9 of the drawing. Fig. 8 illustrates the prior art construction where a laminated pressure vessel not stress-relieved and not X-rayed, for certain conditions of pressure and radius must have a wall thickness of approximately 8", the maximum permissible stress being 80% of 17,500 per sq. in., or 14,000 per sq. in. at the inner lamination, or at point R' in Fig. 8.

Figure 9:
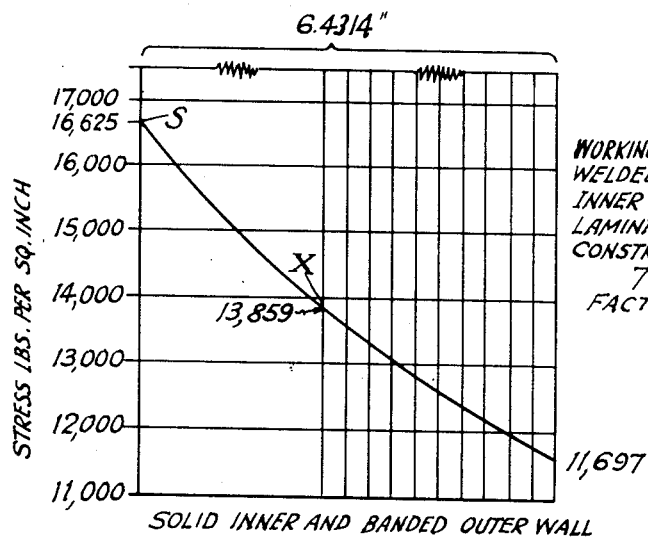
Fig. 9 is a diagrammatic view of the nature of a stress diagram for a wall of a vessel constructed in accord with this invention and for the same working pressure as the Fig. 8 vessel.

Fig. 9 illustrates stress conditions in a wall of a vessel constructed according to this invention for the same radius and same working pressure. The Fig. 9 wall has a thickness of approximately 6.43" and maintains all stresses within the code limitations for the two types of welds employed. The maximum stress permissible on the inner shell which is stress-relieved and X-rayed, is 95% of 17,500 per sq. in., or 16,625 per sq. in., and the maximum stress permissible at the point "X," or at the first band (which is not stress-relieved and not X-rayed), is 80% of 17,500 per sq. in., or 14,000 per sq. in. It will be noted that the stress in the first band, or point "X," is 13,859 per sq. in., somewhat within the value permitted by the code authorities.

Figs. 8 and 9 take into consideration the facts that the magnitude and variation of stress through the wall thickness of a cylinder under internal pressure follow certain natural laws, the stress being at a maximum on the inner shell surface, and at a minimum on the outer shell surface. The difference between the stress on the inner and outer shell surfaces is equivalent to the internal pressure. Further, the stress throughout the wall thickness varies as the square of the radius from the center of the cylinder.

Figs. 5 and 6 indicate a construction to be employed when a nozzle section 63 is provided for a section of the drum. This nozzle section extends through a side opening in the inner shell and is welded to a re-enforcing ring 64, which in turn is welded to the shell, the elements 63 and 64 being preferably welded in position before the inner shell is stress relieved.

Externally of the inner shell, and externally of the major laminations of the outer shell there are applied several additional bands 75 to 82, inclusive. These bands have openings for the nozzle section 63. The bands are clamped around the shell in the manner above described, being arranged so that the nozzle openings in successive bands will be substantially coaxial.

Each of the bands 75—82 is secured in the position in a manner similar to that above described. These bands are, as shown, of gradually decreasing width and their number is such that there is adequate compensation for the weakening of the drum metal occasioned by the provision of the nozzle opening.

After all of the additional bands 75—82 are applied the flanged nozzle section may be secured to the section 65 by the weld 66.

Fig. 7 also shows a drum provided with a manway 83 about which the head is reinforced by an internal ring 82 and an external ring 84. The former is constructed so as to provide a seat 86 for the manway cover 88 which is held in its drum closing position by means of through-bolts 90 and 92. These elements extend through a bar or plate 94 which contacts with the external plate structure 84.

Figure 10:
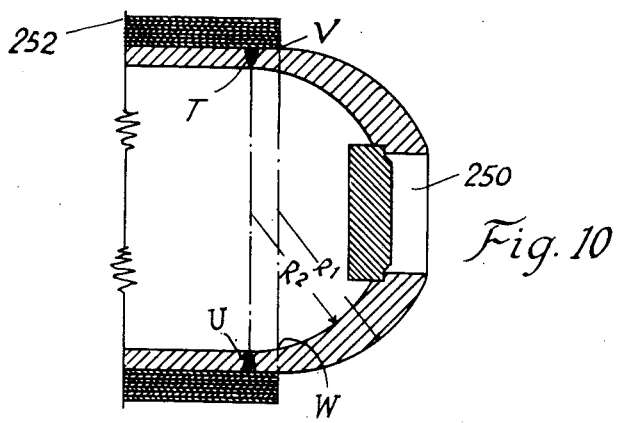
Fig. 10 is a partial section of a pressure vessel of modified head construction.

Fig. 10 shows the illustrative type of pressure vessel with a drum head forged to provide a manway 250. With this construction the wall of the head gradually increases in thickness from the end of the shell represented by the line TU, to the manway. The external surface of the head, to meet such conditions, may have a spherical surface of the radius R' with its center in the line VW while the inner surface of the head may have a similar surface of the radius $R^2$ with a center in the middle of the line TU. In this modification, and for maintaining proper conditions with reference to radial dilation, the bands of the outer shell 252 extend beyond welds at the ends of the line TU and to the plane of the line VW.

The use of a thicker inner section and relatively thin re-enforcing bands reduces the tendency of the inner section to be strained through a difference in temperature of the contents of the vessel. Dividing the outer shell into separated sections also contributes to the minimizing of such strain due to a difference in expansion, and, combined with the thicker shell of the inner section, provides a construction which is less subject to local strain, which may cause trouble through corrosive action, than a vessel made up of a number of relatively thin bands.

This application is a division of my co-pending parent application, Ser. No. 393,876, filed May 17, 1941, now Patent 2,376,551.

What is claimed is:

1. In apparatus for use in the manufacture of a heavy cylindrical steel pressure vessel having metallic bands constituting its radially successive laminations, band tensioning mechanism including a heavy steel frame having a longitudinal member under compression during operation and resting upon at least one of the adjacent and spaced ends of an incompleted pressure band, said frame member having means associated therewith for positioning and holding the frame in transverse relationship to the longitudinal axis of a pressure vessel component, a plurality of axially spaced steel loops secured to and disposed laterally of said frame, the loops normally encircling an adjacent pressure vessel component and an incomplete band which is being applied to constitute one of the radially successive pressure vessel laminations, said longitudinal member of the frame normally disposed transversely the zone of incompletion of a band, loop anchoring means fixed to adjacent and corresponding ends of said loops and fixed to said frame at adjacent positions arranged parallel to said zone, the other ends of said loops being movable relative to their anchored ends, and fluid pressure power means having a fixed part anchored to the frame and a movable part simultaneously acting upon the movable ends of the loops to tighten and tension the loops around the underlying pressure vessel band from the anchored positions of the loops, the stretch of the loops being progressive from their anchored ends and coordinated with the tensioning of said band.

2. In apparatus for use in the manufacture of a heavy multilayer cylindrical steel pressure vessel having steel bands constituting its radially successive laminations, band tensioning mechanism including a longitudinally extended heavy steel base or frame having a longitudinal member under compression during operation and resting upon and anchoring at least one of the adjacent and spaced ends of an incompleted pressure vessel band, said frame member having a formation associated therewith for positioning and holding the frame in transverse relationship to the longitudinal axis of a pressure vessel component, a plurality of axially spaced steel loops pendently secured to said frame, the loops normally encircling an adjacent pressure vessel component and an incomplete band which is being applied to constitute one of the radially successive pressure vessel layers, said longitudinal member of the frame normally disposed transversely the zone of incompletion of a band, loop anchoring means fixed to adjacent and corresponding ends of said loops and fixed to said frame at adjacent positions toward one end of the frame, the other ends of said loops being movable relative to their anchored ends, and fluid pressure power means having a fixed part anchored to the frame and a movable part fixed to the other ends of the loops and simultaneously acting upon the movable ends of the loops to tighten and tension the loops around the underlying pressure vessel band from the anchored positions of the loops, the fixed part of said power means being secured to the frame toward its other end, the stretch of the loops being progressive from their anchored ends and coordinated with the tensioning of said band.

CECIL H. GAY.

REFERENCES CITED

The following references are of record in the file of this patent:

UNITED STATES PATENTS

| Number | Name | Date |
|---|---|---|
| 1,529,685 | Beugler | Mar. 17, 1925 |
| 1,770,763 | Wolfstyn | July 15, 1930 |
| 1,920,791 | Hogan | Aug. 1, 1933 |
| 2,003,648 | Frye | June 4, 1935 |
| 2,217,090 | Zerbe | Oct. 8, 1940 |
| 2,234,819 | Butcher | Mar. 11, 1941 |
| 2,273,736 | Raymond | Feb. 17, 1942 |

FOREIGN PATENTS

| Number | Country | Date |
|---|---|---|
| 37,761 | Denmark | Aug. 1, 1927 |